(12) United States Patent
Zhang

(10) Patent No.: US 10,565,939 B2
(45) Date of Patent: Feb. 18, 2020

(54) DISPLAY CONTROL METHOD AND DISPLAY CONTROL SYSTEM OF LIQUID CRYSTAL DISPLAY DEVICE

(71) Applicant: Shenzhen China Star Optoelectronics Semiconductor Display Technology Co., Ltd., Guangdong (CN)

(72) Inventor: Xianming Zhang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 162 days.

(21) Appl. No.: 15/577,471

(22) PCT Filed: Sep. 11, 2017

(86) PCT No.: PCT/CN2017/101195
§ 371 (c)(1),
(2) Date: Nov. 28, 2017

(87) PCT Pub. No.: WO2019/015060
PCT Pub. Date: Jan. 24, 2019

(65) Prior Publication Data
US 2019/0073967 A1 Mar. 7, 2019

(51) Int. Cl.
*G09G 3/34* (2006.01)
*G09G 3/00* (2006.01)
(Continued)

(52) U.S. Cl.
CPC ..... *G09G 3/3406* (2013.01); *G02F 1/133602* (2013.01); *G09G 3/00* (2013.01);
(Continued)

(58) Field of Classification Search
CPC .......... G09G 3/3406; G09G 3/00; G09G 3/36; G09G 2320/0257; G09G 2320/0276;
(Continued)

(56) References Cited

U.S. PATENT DOCUMENTS

2009/0160877 A1* 6/2009 Peng ................... G09G 3/3426
345/690
2009/0167675 A1* 7/2009 Park .................... G02F 1/13452
345/102

(Continued)

FOREIGN PATENT DOCUMENTS

CN 103187032 A 7/2013
CN 105869581 A 8/2016
(Continued)

*Primary Examiner* — Premal R Patel
(74) *Attorney, Agent, or Firm* — Muncy, Geissler, Olds & Lowe, P.C.

(57) ABSTRACT

The present disclosure provides a display control method of a liquid crystal display (LCD) device, where the display control method comprises: obtaining a brightness of a backlight module of the LCD device; determining whether the brightness of the backlight module is greater than a first predetermined value; adjusting the brightness of the backlight module to the first predetermined value and adjusting a gamma value of a display panel of the LCD device according to the adjusted brightness of the backlight module to maintain display brightness of the display panel if the brightness of the backlight module is less than or equal to the first predetermined value.

7 Claims, 3 Drawing Sheets

(51) Int. Cl.
*G02F 1/1335* (2006.01)
*G09G 3/36* (2006.01)
*G02F 1/13357* (2006.01)

(52) U.S. Cl.
CPC ............ *G09G 3/36* (2013.01); *G02F 1/1336* (2013.01); *G09G 2320/0257* (2013.01); *G09G 2320/0276* (2013.01); *G09G 2320/0626* (2013.01); *G09G 2320/0673* (2013.01); *G09G 2330/021* (2013.01)

(58) Field of Classification Search
CPC ..... G09G 2330/021; G09G 2320/0673; G09G 2320/0626; G02F 1/133602; G02F 1/1336
See application file for complete search history.

(56) References Cited

U.S. PATENT DOCUMENTS

| | | |
|---|---|---|
| 2013/0169692 A1 | 7/2013 | Wang |
| 2018/0173060 A1 | 6/2018 | Guo et al. |
| 2018/0232102 A1* | 8/2018 | Ko .......................... G06F 3/044 |
| 2019/0050078 A1* | 2/2019 | Hamada ................. H05K 1/118 |

FOREIGN PATENT DOCUMENTS

| | | |
|---|---|---|
| CN | 106157904 A | 11/2016 |
| CN | 106710536 A | 5/2017 |

* cited by examiner

DISPLAY CONTROL METHOD AND DISPLAY CONTROL SYSTEM OF LIQUID CRYSTAL DISPLAY DEVICE

BACKGROUND OF THE INVENTION

1. Field of the Invention

The present disclosure relates to the field of display techniques, and more particularly to a display control method and a display control system of a liquid crystal display device.

2. Description of Prior Art

With the development of technology, liquid crystal display (LCD) devices are fully utilized in many fields of society, and people have increasing quality requirements for the LCD devices.

In a conventional LCD device, images may be displayed for a long time, which causes polarization of liquid crystal molecules corresponding to the images, and causes the LCD device not to recover a deflection angle of the liquid crystal molecules corresponding to the images. Namely, when the LCD device displays other images, ghosting appears in display areas of some images in ghosting set, such as in a top left corner of a display screen or a top right corner vaguely appears in other images that do not have a television channel logo.

Therefore, there is a need to provide a display control method and system of an LCD device to solve existing issues of the prior art.

SUMMARY OF THE INVENTION

The aim of the present disclosure is to provide a display control method and system of a liquid crystal display (LCD) device capable of eliminating a ghosting phenomenon of the LCD device and solving the ghosting phenomenon of a part of the display area of a conventional LCD device.

The present disclosure provides a display control method of an LCD device, where the method comprises:

obtaining a brightness of a backlight module of the LCD device;

determining whether the brightness of the backlight module is greater than a first predetermined value;

maintaining display parameters of the LCD device if the brightness of the backlight module is greater than the first predetermined value;

adjusting the brightness of the backlight module to the first predetermined value and adjusting a gamma value of a display panel of the LCD device according to the adjusted brightness of the backlight module to maintain display brightness of the display panel if the brightness of the backlight module is less than or equal to the first predetermined value;

determining whether the brightness of the backlight module corresponding to an image frame displayed on the display panel is less than or equal to a second predetermined value if the brightness of the backlight module is less than or equal to the first predetermined value, where the second predetermined value is less than the first predetermined value;

adjusting the brightness of the backlight module to the first predetermined value and adjusting the gamma value of the display panel of the LCD device according to the adjusted brightness of the backlight module to maintain the display brightness of the display panel if the brightness of the backlight module is greater than the second predetermined value; and adjusting the brightness of the backlight module to a third predetermined value and adjusting the gamma value of the display panel of the LCD device according to the adjusted brightness of the backlight module to maintain the display brightness of the display panel if the brightness of the backlight module is less than or equal to the second predetermined value; where the third predetermined value is greater than the first predetermined value.

The first predetermined value is set as 85% to 95% of a maximum brightness of the backlight module.

The second predetermined value is set as 60% to 67% of a maximum brightness of the backlight module.

The third predetermined value is set as 140% to 145% of a current brightness of the backlight module of the LCD device.

The present disclosure provides a display control method of the LCD device, where the method comprises:

obtaining a brightness of a backlight module of the LCD device;

determining whether the brightness of the backlight module is greater than a first predetermined value;

maintaining display parameters of the LCD device if the brightness of the backlight module is greater than the first predetermined value; and adjusting the brightness of the backlight module to the first predetermined value and adjusting gamma value of a display panel of the LCD device according to the adjusted brightness of the backlight module to maintain display brightness of the display panel if the brightness of the backlight module is less than or equal to the first predetermined value.

In the display control method of the LCD device of the present disclosure, the method further comprises:

determining whether the brightness of the backlight module corresponding to an image frame displayed on the display panel is less than or equal to a second predetermined value if the brightness of the backlight module is less than or equal to the first predetermined value, wherein the second predetermined value is less than the first predetermined value;

adjusting the brightness of the backlight module to the first predetermined value and adjusting the gamma value of the display panel of the LCD device according to the adjusted brightness of the backlight module to maintain the display brightness of the display panel if the brightness of the backlight module is greater than the second predetermined value; and adjusting the brightness of the backlight module to a third predetermined value and adjusting the gamma value of the display panel of the LCD device according to the adjusted brightness of the backlight module to maintain the display brightness of the display panel if the brightness of the backlight module is less than or equal to the second predetermined value; wherein the third predetermined value is greater than the first predetermined value.

In the display control method of the LCD device of the present disclosure, the first predetermined value is set as 85% to 95% of a maximum brightness of the backlight module.

In the display control method of the LCD device of the present disclosure, the second predetermined value is set as 60% to 67% of a maximum brightness of the backlight module.

In the display control method of the LCD device of the present disclosure, the third predetermined value is set as 140% to 145% of a current brightness of the backlight module of the LCD device.

In the display control method of the LCD device of the present disclosure, the step for obtaining the brightness of the backlight module of the LCD device, the step comprises:

determining the brightness of the backlight module corresponding to an image frame displayed on the display panel according to a duty ratio of a pulse width modulation signal of the backlight module.

In the display control method of the LCD device of the present disclosure, the step for adjusting the gamma value of the display panel of the LCD device according to the adjusted brightness of the backlight module, the step comprises:

obtaining a brightness adjustment proportion of the adjusted brightness of the backlight module and the brightness of the backlight module corresponding to an image frame displayed on the display panel before adjusting; and adjusting the gamma value of the display panel of the LCD device according to the brightness adjustment proportion.

The present disclosure provides a display control system of the LCD device, where the system comprises:

an obtaining brightness module configured to obtain a brightness of a backlight module of the LCD device;

a first determining module configured to determine whether the brightness of the backlight module is greater than a first predetermined value;

a first adjustment module configured to adjust the brightness of the backlight module to the first predetermined value and adjust a gamma value of a display panel of the LCD device according to the adjusted brightness of the backlight module to maintain a display brightness of the display panel if the brightness of the backlight module is less than or equal to the first predetermined value; and a second adjustment module configured to maintain display parameters of the LCD device if the brightness of the backlight module is greater than the first predetermined value.

In the display control system of the LCD device of the present disclosure, the display control system further comprises:

a second determining module configured to determine whether the brightness of the backlight module corresponding to an image frame displayed on the display panel is less than or equal to a second predetermined value when the brightness of the backlight module is less than or equal to the first predetermined value; where the second predetermined value is less than the first predetermined value;

a third adjustment module configured to adjust the brightness of the backlight module to a third predetermined value and adjust the gamma value of the display panel of the LCD device according to the adjusted brightness of the backlight module to maintain the display brightness of the display panel if the brightness of the backlight module is less than or equal to the second predetermined value; wherein the third predetermined value is greater than the first predetermined value; and a fourth adjustment module configured to adjust the brightness of the backlight module to the first predetermined value and adjust the gamma value of the display panel of the LCD device according to the adjusted brightness of the backlight module to maintain the display brightness of the display panel if the brightness of the backlight module is greater than the second predetermined value.

In the display control system of the LCD device of the present disclosure, the first predetermined value is set as 85% to 95% of a maximum brightness of the backlight module.

In the display control system of the LCD device of the present disclosure, the second predetermined value is set as 60% to 67% of a maximum brightness of the backlight module.

In the display control system of the LCD device of the present disclosure, the third predetermined value is set as 140% to 145% of a current brightness of the backlight module of the LCD device.

In the display control system of the LCD device of the present disclosure, the obtaining brightness module configured to determine the brightness of the backlight module corresponding to an image frame displayed on the display panel according to a duty ratio of a pulse width modulation signal of the backlight module.

In the display control system of the LCD device of the present disclosure, the first adjustment module is configured to adjust the gamma value of the display panel of the LCD device according to the adjusted brightness of the backlight module, the step comprises:

obtaining a brightness adjustment proportion of the adjusted brightness of the backlight module and the brightness of the backlight module corresponding to an image frame displayed on the display panel before adjusting; and adjusting the gamma value of the display panel of the LCD device according to the brightness adjustment proportion.

The display control method and system of the LCD device of the embodiment adjusts the gamma value of the display panel on the same brightness by adjusting the brightness of the backlight module, which avoids phenomenon of polarization of liquid crystal molecules and eliminates the ghosting phenomenon of the LCD device, further solving the ghosting phenomenon of the part of a display area of the LCD device of the prior art.

BRIEF DESCRIPTION OF THE DRAWINGS

In order to describe clearly the embodiment in the present invention or the prior art, the following will introduce the drawings for the embodiment shortly. Obviously, the following description is only a few embodiments, for the common technical personnel in the field it is easy to acquire some other drawings without creative work.

DETAILED DESCRIPTION OF THE PREFERRED EMBODIMENTS

Figure 1:
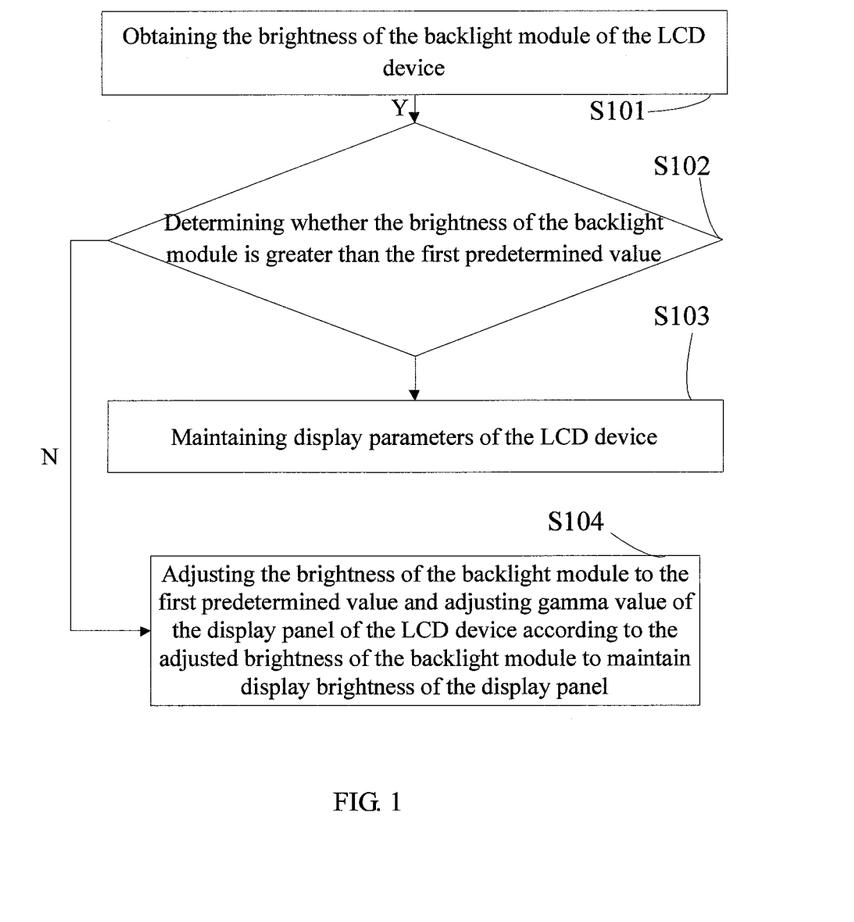
FIG. 1 is a flowchart of a display control method of a liquid crystal display (LCD) device according to a first embodiment of the present disclosure.

In order to more clearly illustrate the aim, the technical scheme, and the effects of the present disclosure, the present disclosure will further be described in detail according to the drawings. It should be understood that the present disclosure has been described with reference to certain preferred and alternative embodiments which are intended to be exemplary only and do not limit the full scope of the present disclosure FIG. 1 is a flowchart of a display control method of a liquid crystal display (LCD) device according to a first embodiment of the present disclosure. The method of the display control method of the LCD device of the embodiment comprises:

step 101: obtaining a brightness of a backlight module of the LCD device;

In the step for obtaining the brightness of the backlight module of the LCD device corresponding to the image frame displayed on the display panel, brightness of the backlight module corresponding to the image frame displayed on the display panel is determined according to the duty ratio of the pulse width modulation (PWM) signal of the backlight module, and the flow moves to S102.

S102: determining whether the brightness of the backlight module is greater than a first predetermined value. If the brightness of the backlight module is greater than the first predetermined value, the flow moves to S103. If the brightness of the backlight module is less than the first predetermined value, the flow moves to S104.

In the step for determining whether the brightness of the backlight module of the LCD device corresponding to the image frame displayed on the display panel is greater than the predetermined value. This namely determines whether the brightness of the backlight module can be improved. Furthermore, the first predetermined value is set as 85% to 95% of a maximum brightness of the backlight module.

If the brightness of the backlight module of the LCD device corresponding to the image frame displayed on the display panel is greater than the predetermined value, the flow moves to S103. If the brightness of the backlight module of the LCD device corresponding to the image frame displayed on the display panel is less than the predetermined value, the flow moves to S104.

S103: maintaining the display parameters of the LCD device.

If the brightness of the backlight module of the LCD device corresponding to the image frame displayed on the display panel is greater than the predetermined value, the brightness of the backlight module does not be improved. Thus, the display parameters of the LCD device are maintained, such as the brightness of the backlight module and the gamma value of the display panel.

S104: adjusting the brightness of the backlight module to the first predetermined value and adjusting gamma value of the display panel of the LCD device according to the adjusted brightness of the backlight module to maintain the display brightness of the display panel.

If the brightness of the backlight module is less than or equal to the first predetermined value, the brightness of the backlight module can be improved. Thus, the brightness of the backlight module is adjusted to the first predetermined value, the gamma value of the display panel of the LCD device is adjusted according to the adjusted brightness of the backlight module to maintain the display brightness of the display panel.

To be specific, obtaining the brightness adjustment proportion of the adjusted brightness of the backlight module and the brightness of the backlight module corresponding to an image frame displayed on the display panel before adjusting, and adjusting the gamma value of the display panel of the LCD device according to the brightness adjustment proportion.

Thus, the display brightness of the display panel is maintained, the gamma value of the display panel is adjusted, which effectively avoids a ghosting phenomenon of a part of the display area of the display panel.

Thus, adjustment of the display parameters of the LCD device of the display control method of the LCD device of the embodiment is finished.

The display control method of the LCD device of the embodiment adjusts the gamma value of the display panel on the same brightness by adjusting the brightness of the backlight module, which avoids phenomenon of polarization of liquid crystal molecules and eliminates the ghosting phenomenon of the LCD device.

Figure 2:
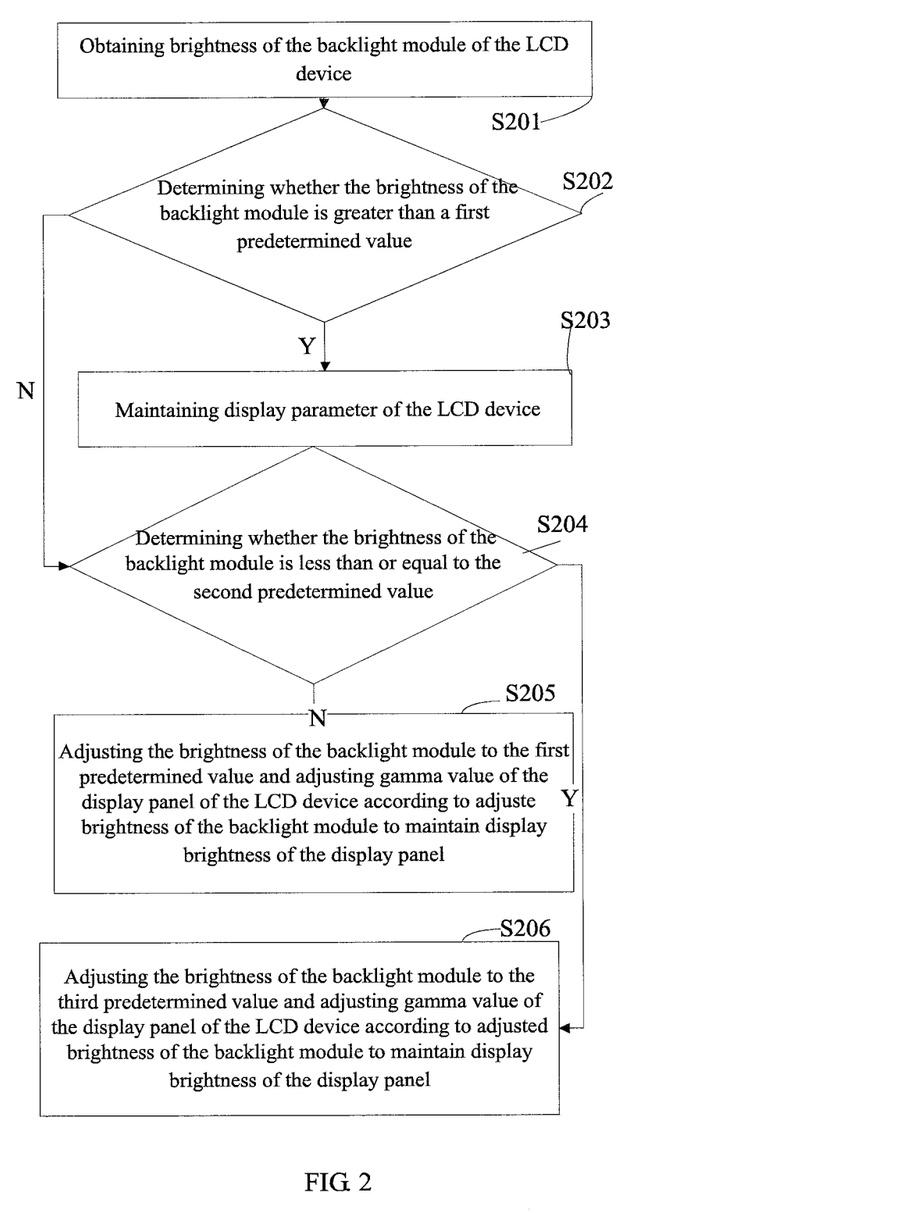
FIG. 2 is a flowchart of the display control method of the LCD device according to a second embodiment of the present disclosure.

FIG. 2 is a flowchart of the display control method of the LCD device according to a second embodiment of the present disclosure. The display control method of the LCD device of the embodiment comprises:

S201: obtaining the brightness of a backlight module of the LCD device.

In the step for obtaining the brightness of the backlight module of the LCD device corresponding to the image frame displayed on the display panel, such as: determining the brightness of the backlight module corresponding to the image frame displayed on the display panel according to according to duty ratio of pulse width modulation (PWM) signal of the backlight module, and the flow moves to S202.

S202: determining whether the brightness of the backlight module is greater than a first predetermined value. If the brightness of the backlight module is greater than the first predetermined value, the flow moves to S203. If the brightness of the backlight module is less than the first predetermined value, the flow moves to S204.

In the step for determining whether the brightness of the backlight module of the LCD device corresponding to the image frame displayed on the display panel is greater than the predetermined value; namely determining whether the brightness of the backlight module can be improved. Furthermore, the first predetermined value is set as 85% to 95% of a maximum brightness of the backlight module.

If the brightness of the backlight module of the LCD device corresponding to the image frame displayed on the display panel is greater than the predetermined value, the flow moves to S203. If the brightness of the backlight module of the LCD device corresponding to the image frame displayed on the display panel is less than the predetermined value, the flow moves to S204.

S203: maintaining the display parameters of the LCD device.

If the brightness of the backlight module of the LCD device corresponding to the image frame displayed on the display panel is greater than the predetermined value, the brightness of the backlight module does not be improved. Thus, the display parameters of the LCD device are maintained, such as: the brightness of the backlight module, and gamma value of the display panel.

S204: determining whether the brightness of the backlight module is less than or equal to a second predetermined value. If the brightness of the backlight module is greater than the second predetermined value, the flow moves to S205. If the brightness of the backlight module is less than or equal to the second predetermined value, the flow moves to S206.

In the step for determining whether the brightness of the backlight module corresponding to the image frame displayed on the display panel is less than or equal to a second predetermined value, if the brightness of the backlight module corresponding to the image frame displayed on the display panel is greater than the second predetermined value, the flow moves to S205. If the brightness of the backlight module corresponding to the image frame displayed on the display panel is less than or equal to the second predetermined value, the flow moves to S206. Furthermore, the second predetermined value is set as 60% to 67% of a maximum brightness of the backlight module.

S205: adjusting the brightness of the backlight module to the first predetermined value and adjusting gamma value of the display panel of the LCD device according to adjusted brightness of the backlight module to maintain display brightness of the display panel.

As the brightness of the backlight module is close to the maximum brightness of the backlight module, the brightness of the backlight module is adjusted to the first predetermined value and the gamma value of the display panel of the LCD device is adjusted according to adjusted brightness of the backlight module to maintain the display brightness of the display panel.

S206: adjusting the brightness of the backlight module to a third predetermined value and adjusting the gamma value of the display panel of the LCD device according to the adjusted brightness of the backlight module to maintain the display brightness of the display panel.

As the difference between the brightness of the backlight module and the maximum brightness of the backlight module is greater, the brightness of the backlight module is adjusted to the third predetermined value and the gamma value of the display panel of the LCD device is adjusted according to adjusted brightness of the backlight module to maintain the display brightness of the display panel. Furthermore, the third predetermined value is set as 140% to 145% of a maximum brightness of the backlight module.

When the gamma value of the display panel of the LCD device is reduced by 30%, the risk of the ghosting phenomenon of the LCD device is very low. Thus, there is no need to continue to increase the brightness of the backlight module to reduce the gamma value of the display panel. When the brightness of the backlight module is low, the brightness of the backlight module is increased by 1.4 times and the ghosting phenomenon of the LCD device can be eliminated.

Thus, adjustment of the display parameters of the LCD device of the display control method of the LCD device of the embodiment is finished.

Based on the first embodiment, the display control method of the LCD device of the embodiment sets the second predetermined value and the third predetermined value to eliminate the ghosting phenomenon of the LCD device and reduce energy consumption of the LCD device.

Figure 3:
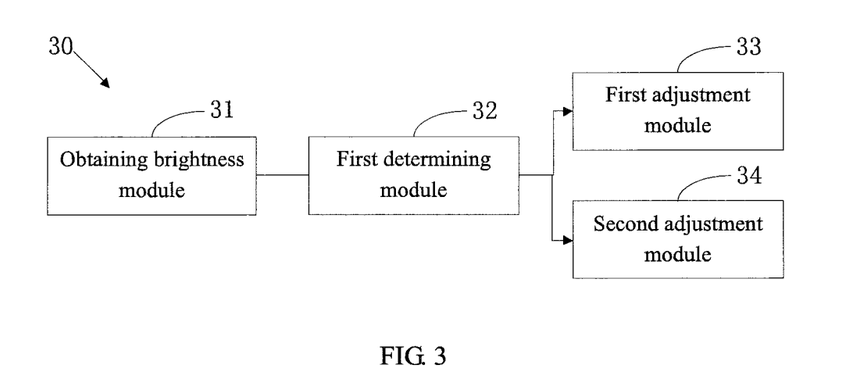
FIG. 3 is a structural diagram of a display control system of the LCD device according to a first embodiment of the present disclosure.

The present disclosure provides a display control system of the LCD device as shown in FIG. 3, which is a structural diagram of a display control system of the LCD device according to a first embodiment of the present disclosure. The display control system of the embodiment applies to the above display control method of the first embodiment. The display control system 30 of the LCD device of the embodiment comprises an obtaining brightness module 31, a first determining module 32, a first adjustment module 33, and a second adjustment module 34.

The obtaining brightness module 31 is configured to obtain the brightness of the backlight module of the LCD device. The first determining module 32 is configured to determine whether the brightness of the backlight module is greater than a first predetermined value. The first adjustment module 33 is configured to adjust the brightness of the backlight module to the first predetermined value and adjust the gamma value of the display panel of the LCD device according to the adjusted brightness of the backlight module to maintain display brightness of the display panel if the brightness of the backlight module is less than or equal to the first predetermined value. The second adjustment module 34 is configured to maintain display parameters of the LCD device.

Specific operation principles of the display control system of the LCD device of the embodiment are the same as or similar to the display control method of the LCD device of the first embodiment. Refer to relative description of the display control method of the LCD device of the first embodiment.

Figure 4:
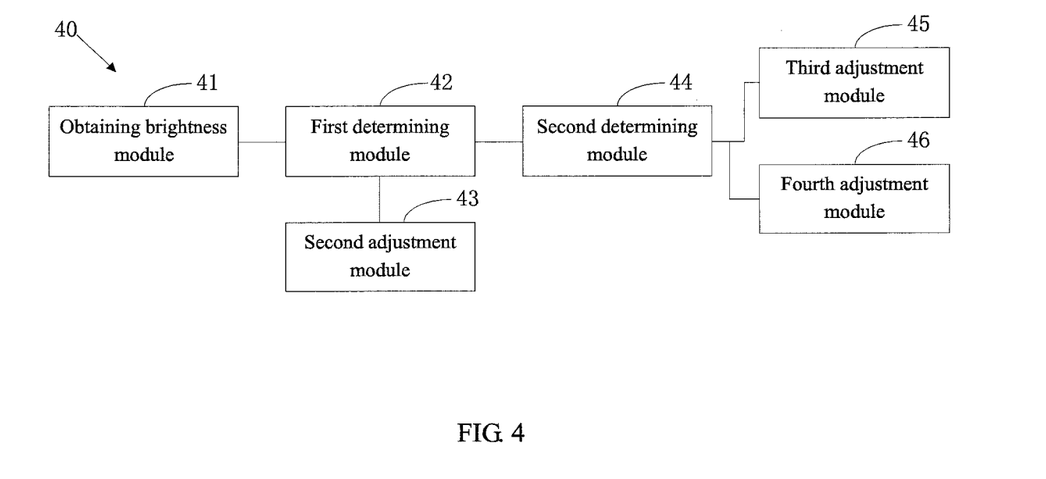
FIG. 4 is a structural diagram of the display control system of the LCD device according to a first embodiment of the present disclosure.

FIG. 4 is a structural diagram of the display control system of the LCD device according to a first embodiment of the present disclosure. The display control system of the embodiment applies to the above display control method of the second embodiment. The display control system 40 of the LCD device of the embodiment comprises an obtaining brightness module 41, a first determining module 42, a second adjustment module 43, a second determining module 44, a third adjustment module 45, and a fourth adjustment module 46.

The obtaining brightness module 41 is configured to obtain the brightness of the backlight module of the LCD device.

The first determining module 42 is configured to determine whether the brightness of the backlight module is greater than a first predetermined value.

The second adjustment module 43 is configured to maintain display parameters of the LCD device if the brightness of the backlight module is greater than a first predetermined value.

The second determining module 44 is configured to determine whether the brightness of the backlight module corresponding to the image frame displayed on the display panel is less than or equal to a second predetermined value if the brightness of the backlight module is less than or equal to the first predetermined value. The second predetermined value is less than the first predetermined value.

The third adjustment module 45 is configured to adjust the brightness of the backlight module to the third predetermined value and adjust the gamma value of the display panel of the LCD device according to the adjusted brightness of the backlight module to maintain display brightness of the display panel if the brightness of the backlight module is less than or equal to the second predetermined value. The third predetermined value is greater than the first predetermined value.

The fourth adjustment module 46 is configured to adjust the brightness of the backlight module to the first predetermined value and adjust the gamma value of the display panel of the LCD device according to the adjusted brightness of the backlight module to maintain display brightness of the display panel if the brightness of the backlight module is greater than the second predetermined value.

The first predetermined value is set as 85% to 95% of a maximum brightness of the backlight module, the second predetermined value is set as 60% to 67% of a maximum brightness of the backlight module, and the third predetermined value is set as 140% to 145% of a maximum brightness of the backlight module.

Specific operation principles of the display control system of the LCD device of the embodiment are the same as or similar to the display control method of the LCD device of the second embodiment. Refer to the relative description of the display control method of the LCD device of the second embodiment.

The display control method and system of the LCD device of the embodiment adjusts the gamma value of the display panel to the same brightness by adjusting the brightness of the backlight module, which avoids the phenomenon of polarization of liquid crystal molecules and eliminates the ghosting phenomenon of the LCD device, further solving the ghosting phenomenon of part of display area of the LCD device of the prior art.

It should be understood from the above that the present disclosure has been described with reference to certain preferred and alternative embodiments which are intended to be exemplary only and do not limit the full scope of the present disclosure as set forth in the appended claims

What is claimed is:

1. A display control method of a liquid crystal display (LCD) device, comprising:
   obtaining a brightness of a backlight module of the LCD device;
   determining whether the brightness of the backlight module is greater than a first predetermined value;
   maintaining display parameters of the LCD device if the brightness of the backlight module is greater than the first predetermined value;
adjusting the brightness of the backlight module to the first predetermined value and adjusting a gamma value of a display panel of the LCD device according to the adjusted brightness of the backlight module to maintain a display brightness of the display panel if the brightness of the backlight module is less than or equal to the first predetermined value;
   determining whether the brightness of the backlight module corresponding to an image frame displayed on the display panel is less than or equal to a second predetermined value if the brightness of the backlight module is less than or equal to the first predetermined value, wherein the second predetermined value is less than the first predetermined value;
   adjusting the brightness of the backlight module to the first predetermined value and adjusting the gamma value of the display panel of the LCD device according to the adjusted brightness of the backlight module to maintain the display brightness of the display panel if the brightness of the backlight module is greater than the second predetermined value; and
   adjusting the brightness of the backlight module to a third predetermined value and adjusting the gamma value of the display panel of the LCD device according to the adjusted brightness of the backlight module to maintain the display brightness of the display panel if the brightness of the backlight module is less than or equal to the second predetermined value;
wherein the third predetermined value is greater than the first predetermined value;
   wherein the first predetermined value is set as 85% to 95% of a maximum brightness of the backlight module;
   wherein the second predetermined value is set as 60% to 67% of a maximum brightness of the backlight module;
   wherein the third predetermined value is set as 140% to 145% of a current brightness of the backlight module of the LCD device.

2. A display control method of a liquid crystal display (LCD) device, comprising:
   obtaining a brightness of a backlight module of the LCD device;
   determining whether the brightness of the backlight module is greater than a first predetermined value;
   maintaining display parameters of the LCD device if the brightness of the backlight module is greater than the first predetermined value; and
   adjusting the brightness of the backlight module to the first predetermined value and adjusting a gamma value of a display panel of the LCD device according to adjusted brightness of the backlight module to maintain display brightness of the display panel if the brightness of the backlight module is less than or equal to the first predetermined value;
wherein the display control method further comprises:
   determining whether the brightness of the backlight module corresponding to an image frame displayed on the display panel is less than or equal to a second predetermined value if the brightness of the backlight module is less than or equal to the first predetermined value, wherein the second predetermined value is less than the first predetermined value;
   adjusting the brightness of the backlight module to the first predetermined value and adjusting the gamma value of the display panel of the LCD device according to the adjusted brightness of the backlight module to maintain the display brightness of the display panel if the brightness of the backlight module is greater than the second predetermined value; and
   adjusting the brightness of the backlight module to a third predetermined value and adjusting the gamma value of the display panel of the LCD device according to the adjusted brightness of the backlight module to maintain the display brightness of the display panel if the brightness of the backlight module is less than or equal to the second predetermined value;
wherein the third predetermined value is greater than the first predetermined value.

3. The display control method of the LCD device as claimed in claim 2, wherein the first predetermined value is set as 85% to 95% of a maximum brightness of the backlight module.

4. The display control method of the LCD device as claimed in claim 2, wherein the second predetermined value is set as 60% to 67% of a maximum brightness of the backlight module.

5. The display control method of the LCD device as claimed in claim 2, wherein the third predetermined value is set as 140% to 145% of a current brightness of the backlight module of the LCD device.

6. The display control method of the LCD device as claimed in claim 2, wherein the step for adjusting the gamma value of the display panel of the LCD device according to the adjusted brightness of the backlight module comprises:
   obtaining brightness adjustment proportion of the adjusted brightness of the backlight module and the brightness of the backlight module corresponding to an image frame displayed on the display panel before adjusting; and
   adjusting the gamma value of the display panel of the LCD device according to the brightness adjustment proportion.

7. A display control method of a liquid crystal display (LCD) device, comprising:
   obtaining a brightness of a backlight module of the LCD device;
   determining whether the brightness of the backlight module is greater than a first predetermined value;

maintaining display parameters of the LCD device if the brightness of the backlight module is greater than the first predetermined value; and adjusting the brightness of the backlight module to the first predetermined value and adjusting a gamma value of a display panel of the LCD device according to adjusted brightness of the backlight module to maintain display brightness of the display panel if the brightness of the backlight module is less than or equal to the first predetermined value;

wherein the step for obtaining the brightness of the backlight module of the LCD device comprises:

determining the brightness of the backlight module corresponding to an image frame displayed on the display panel according to a duty ratio of a pulse width modulation signal of the backlight module.

* * * * *

UNITED STATES PATENT AND TRADEMARK OFFICE
CERTIFICATE OF CORRECTION

PATENT NO. : 10,565,939 B2  
APPLICATION NO. : 15/577471  
DATED : February 18, 2020  
INVENTOR(S) : Xianming Zhang

Page 1 of 1

It is certified that error appears in the above-identified patent and that said Letters Patent is hereby corrected as shown below:

On the Title Page

Column 1, In (30) Foreign Application Priority Data, add:
-- July 19, 2017 (CN) ............................ 201710592158.6 --.

Signed and Sealed this  
Seventh Day of April, 2020

Andrei Iancu  
*Director of the United States Patent and Trademark Office*